(12) United States Patent
Kemmerer et al.

(10) Patent No.: US 12,514,162 B2
(45) Date of Patent: Jan. 6, 2026

(54) HARVESTER HEADER WITH LATERAL BELT ROLLER MOUNT

(71) Applicant: CNH Industrial America LLC, New Holland, PA (US)

(72) Inventors: Benjamin David Kemmerer, Hamburg, PA (US); Joel Cook, Akron, PA (US); Blaine Robert Noll, Fleetwood, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 1081 days.

(21) Appl. No.: 17/293,713

(22) PCT Filed: Nov. 7, 2019

(86) PCT No.: PCT/US2019/060201
§ 371 (c)(1),
(2) Date: May 13, 2021

(87) PCT Pub. No.: WO2020/101993
PCT Pub. Date: May 22, 2020

(65) Prior Publication Data
US 2022/0000031 A1 Jan. 6, 2022

Related U.S. Application Data

(60) Provisional application No. 62/768,578, filed on Nov. 16, 2018.

(51) Int. Cl.
*A01D 57/20* (2006.01)
*A01D 41/14* (2006.01)
*A01D 61/00* (2006.01)

(52) U.S. Cl.
CPC ............. *A01D 57/20* (2013.01); *A01D 41/14* (2013.01); *A01D 61/002* (2013.01)

(58) Field of Classification Search
CPC ....... A01D 41/14; A01D 61/002; A01D 57/20
See application file for complete search history.

(56) References Cited

U.S. PATENT DOCUMENTS 1,533,359 A * 4/1925 White ................... A01D 34/04
56/15.1
1,954,629 A * 4/1934 Kettenbach ........... A01D 57/20
56/238

(Continued)

FOREIGN PATENT DOCUMENTS

BR 102012027932 B1 * 2/2019 ............. A01D 41/14
BR 102019001658 A2 * 10/2019 ............. A01D 34/04

(Continued)

OTHER PUBLICATIONS

International Search Report for PCT application PCT/US2019/060201, mailed Feb. 27, 2020 (13 pages).

(Continued)

*Primary Examiner* — Joseph M Rocca
*Assistant Examiner* — Ashley A Kaercher
(74) *Attorney, Agent, or Firm* — Fletcher Yoder, P.C.

(57) ABSTRACT

A header system is provided. The headers system includes a conveyor belt and a belt roller assembly comprising a belt roller configured to contact the conveyor belt and to rotate about an axis during movement of the conveyor belt. The header system further includes a belt roller assembly mount configured to secure the belt roller on the header system, wherein the belt roller mount assembly comprises a first mounting member configured to secure the belt roller to an infeed deck frame included in the header system.

20 Claims, 10 Drawing Sheets

(56) References Cited

U.S. PATENT DOCUMENTS

| | | | | |
|---|---|---|---|---|
| 2,510,245 | A * | 6/1950 | Munter | A01D 43/077 56/192 |
| 2,850,861 | A * | 9/1958 | Miller | A01D 57/20 56/192 |
| 2,949,718 | A * | 8/1960 | Buchanan | A01D 57/20 56/192 |
| 3,283,485 | A * | 11/1966 | Koch | A01D 57/20 56/14.4 |
| 3,304,699 | A * | 2/1967 | Koch | A01D 57/20 56/14.4 |
| 3,336,735 | A * | 8/1967 | Schoenwald | A01D 43/077 56/14.4 |
| 3,343,347 | A * | 9/1967 | Burrough | A01D 43/077 56/181 |
| 4,038,809 | A * | 8/1977 | Arnould | A01D 57/20 56/124 |
| 4,182,098 | A * | 1/1980 | Kass | A01D 57/20 56/192 |
| 4,429,517 | A * | 2/1984 | Lohrentz | A01D 57/20 56/192 |
| 4,522,018 | A * | 6/1985 | Blakeslee | A01D 57/20 56/192 |
| 4,768,333 | A * | 9/1988 | Reber | A01D 78/06 56/366 |
| 5,005,343 | A * | 4/1991 | Patterson | A01D 57/20 56/14.4 |
| RE35,543 | E * | 7/1997 | Patterson | A01D 41/14 56/14.4 |
| 7,788,891 | B2 * | 9/2010 | Puryk | A01D 61/002 56/153 |
| 8,511,050 | B1 * | 8/2013 | Cormier | A01D 61/002 56/181 |
| 8,776,487 | B2 * | 7/2014 | Coers | A01D 61/002 198/837 |
| 2007/0204589 | A1 * | 9/2007 | Coers | A01D 61/002 56/208 |
| 2008/0202090 | A1 * | 8/2008 | Lovett | A01D 57/20 198/837 |
| 2009/0007533 | A1 * | 1/2009 | Lovett | A01D 61/002 56/14.5 |
| 2012/0023884 | A1 * | 2/2012 | Spikes | A01D 87/02 56/192 |
| 2013/0097986 | A1 * | 4/2013 | Lovett | A01D 41/14 56/153 |
| 2014/0059995 | A1 * | 3/2014 | Cormier | A01D 57/20 56/181 |
| 2014/0130472 | A1 * | 5/2014 | Cook | A01D 34/30 56/16.4 R |
| 2014/0190139 | A1 * | 7/2014 | Cook | A01D 34/145 56/10.1 |
| 2014/0215995 | A1 * | 8/2014 | Cook | A01D 34/145 56/301 |
| 2014/0230398 | A1 * | 8/2014 | Cook | A01D 34/33 56/298 |
| 2014/0245713 | A1 * | 9/2014 | Cook | A01D 34/30 56/290 |
| 2014/0318094 | A1 * | 10/2014 | Cook | A01D 34/14 56/10.1 |
| 2014/0345239 | A1 * | 11/2014 | Cook | A01D 34/02 56/299 |
| 2015/0195992 | A1 * | 7/2015 | Corum | A01D 57/20 198/498 |
| 2015/0305240 | A1 * | 10/2015 | Gessel | A01D 45/025 56/52 |
| 2016/0066503 | A1 * | 3/2016 | Cook | A01D 41/14 56/257 |
| 2016/0073585 | A1 * | 3/2016 | Cook | A01D 69/06 56/10.8 |
| 2016/0135366 | A1 * | 5/2016 | Cook | A01D 34/30 56/307 |
| 2017/0359953 | A1 * | 12/2017 | Wallace | A01D 34/40 |
| 2018/0070531 | A1 * | 3/2018 | Long | A01D 41/145 |
| 2018/0184587 | A1 * | 7/2018 | Cook | A01D 34/305 |
| 2018/0206406 | A1 * | 7/2018 | Joyce | A01D 61/002 |
| 2018/0228086 | A1 * | 8/2018 | Cook | A01D 34/243 |
| 2018/0271019 | A1 * | 9/2018 | Noll | A01D 41/127 |
| 2018/0303029 | A1 * | 10/2018 | Wilbert | A01D 34/86 |
| 2018/0338425 | A1 * | 11/2018 | Cook | A01D 61/002 |
| 2018/0343800 | A1 * | 12/2018 | Noll | A01D 41/14 |
| 2019/0000014 | A1 * | 1/2019 | Farley | A01D 61/002 |
| 2019/0000015 | A1 * | 1/2019 | Lauwers | A01D 41/14 |
| 2019/0014720 | A1 * | 1/2019 | Schropp | A01D 57/20 |
| 2019/0014722 | A1 * | 1/2019 | Farley | A01D 34/02 |
| 2019/0029173 | A1 * | 1/2019 | Noll | A01D 41/127 |
| 2019/0029177 | A1 * | 1/2019 | Enns | A01D 41/14 |
| 2019/0082599 | A1 * | 3/2019 | Cook | A01D 57/03 |
| 2019/0082603 | A1 * | 3/2019 | Farley | A01D 61/02 |
| 2019/0090418 | A1 * | 3/2019 | Cook | A01D 34/30 |
| 2019/0098832 | A1 * | 4/2019 | Schuler | A01D 41/14 |
| 2019/0104677 | A1 * | 4/2019 | Noll | A01D 34/28 |
| 2019/0104682 | A1 * | 4/2019 | Mossman | A01D 57/20 |
| 2019/0124830 | A1 * | 5/2019 | DeChristopher | A01D 34/44 |
| 2019/0124842 | A1 * | 5/2019 | Ricketts | A01D 57/03 |
| 2019/0183049 | A1 * | 6/2019 | Cook | A01D 43/107 |
| 2019/0191625 | A1 * | 6/2019 | Cook | A01D 34/305 |
| 2019/0208702 | A1 * | 7/2019 | Cook | A01D 41/142 |
| 2019/0343048 | A1 * | 11/2019 | Farley | A01D 61/002 |
| 2020/0344952 | A9 * | 11/2020 | Hoffman | A01D 61/02 |
| 2021/0120738 | A1 * | 4/2021 | Ricketts | A01D 41/1276 |
| 2021/0147152 | A1 * | 5/2021 | Cook | A01D 75/00 |
| 2022/0015292 | A1 * | 1/2022 | Kemmerer | A01D 41/141 |

FOREIGN PATENT DOCUMENTS

| | | | | |
|---|---|---|---|---|
| BR | 102019008073 A2 * | 12/2019 | | A01D 34/40 |
| BR | 102015000769 B1 * | 6/2020 | | A01D 57/20 |
| BR | 112020001684 A2 * | 7/2020 | | A01D 41/14 |
| BR | 112021009505 A2 * | 8/2021 | | A01D 41/14 |
| CA | 2581008 A1 * | 10/2007 | | A01D 57/20 |
| CA | 2564777 A1 * | 4/2008 | | A01D 57/20 |
| CA | 2812516 A1 * | 12/2013 | | A01D 41/14 |
| CA | 2823452 A1 * | 2/2014 | | A01D 41/06 |
| CA | 3008959 A1 * | 12/2018 | | A01D 34/8355 |
| CA | 3033499 A1 * | 8/2020 | | A01D 33/04 |
| DE | 10116982 A1 * | 10/2002 | | A01D 57/20 |
| EP | 1721512 A1 * | 11/2006 | | A01D 57/20 |
| EP | 1849349 A1 * | 10/2007 | | A01D 57/20 |
| EP | 2382854 A1 * | 11/2011 | | A01D 41/142 |
| EP | 2420128 A2 * | 2/2012 | | A01D 57/20 |
| EP | 2786650 A1 * | 10/2014 | | A01D 57/20 |
| EP | 2896284 A1 * | 7/2015 | | A01D 57/20 |
| EP | 3150057 A1 * | 4/2017 | | |
| EP | 3286999 A1 * | 2/2018 | | A01D 41/127 |
| EP | 3427565 A1 * | 1/2019 | | A01D 41/12 |
| EP | 3469877 | 4/2019 | | |
| EP | 3469878 A1 * | 4/2019 | | A01D 41/06 |
| EP | 3659425 A1 * | 6/2020 | | A01D 57/20 |
| GB | 1574033 A * | 9/1980 | | A01D 41/14 |
| RU | 2009120215 A * | 12/2010 | | A01D 57/20 |
| WO | WO-2014019681 A1 * | 2/2014 | | A01D 57/20 |
| WO | WO-2020101993 A1 * | 5/2020 | | A01D 41/14 |
| WO | WO-2020146604 A1 * | 7/2020 | | A01D 34/04 |

OTHER PUBLICATIONS

EP Application No. 19 817 452.6 Communication Pursuant to Article 94(3) dated Dec. 6, 2023, 5 pgs.

* cited by examiner

HARVESTER HEADER WITH LATERAL BELT ROLLER MOUNT

BACKGROUND

The disclosure relates generally to a harvester. More specifically, the present disclosure relates to a harvester with one or more lateral belt roller mounts.

A harvester may be used to harvest agricultural crops, such as barley, beans, beets, carrots, corn, cotton, flax, oats, potatoes, rye, soybeans, wheat, or other plant crops. Moreover, a harvester (e.g., combine harvester) is a type of harvester generally used to harvest certain crops that include grain (e.g., barley, corn, flax, oats, rye, wheat, etc.). During operation of a harvester, the harvesting process may begin by removing a plant from a field, such as by using a header. The header may cut the agricultural crops and transport the cut crops to a processing system of the harvester.

Generally, the harvester may be driven through a field to collect and process crops. As the harvester encounters agricultural crops in the field, the header, which is positioned at a front of the harvester, cuts a portion of each crop. Certain components of the harvester, such as the header, may be adjustable to enhance performance of the harvester. For example, the header may move up and down to accommodate uneven ground. Further, the header may include conveyor systems that move cut product into a processing system. It may be beneficial to improve the conveyor systems.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, header system is provided. The header system includes a conveyor belt and a belt roller assembly comprising a belt roller configured to contact the conveyor belt and to rotate about an axis during movement of the conveyor belt. The header system further includes a belt roller assembly mount configured to secure the belt roller on the header system, wherein the belt roller mount assembly comprises a first mounting member configured to secure the belt roller to an infeed deck frame included in the header system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE DRAWINGS

Figure 1:
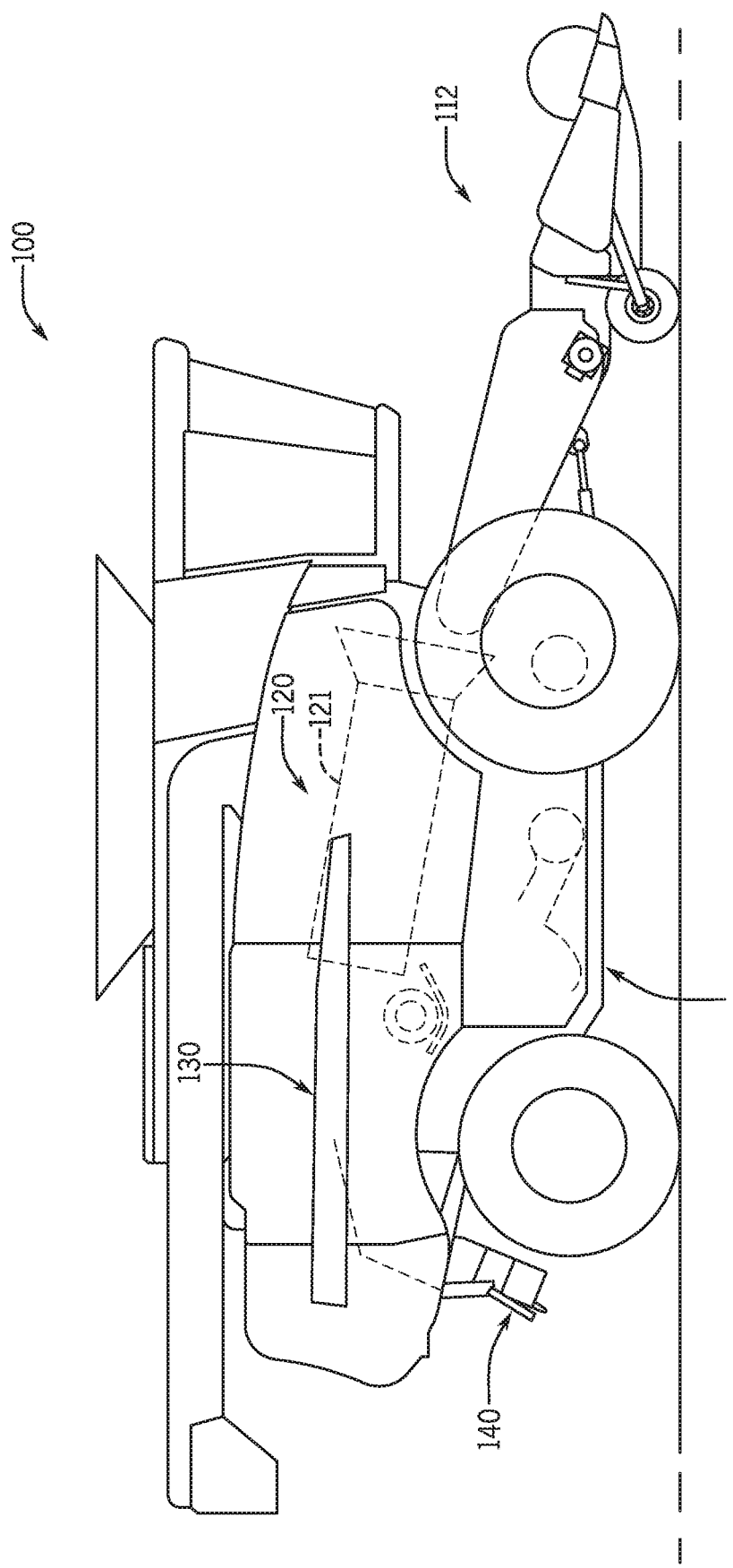
FIG. 1 is a side view of an embodiment of a harvester having a header, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut agricultural crops within a field via a header. The header may also gather the cut agricultural crops into a processing system of the harvester for further processing. The processing system may include a threshing machine configured to thresh the agricultural crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader).

The header may cut crops from the field that are encompassed within the width of the header. The header may include a cutter bar assembly that extends a portion of the width of the header, and the cutter bar assembly may use blades to cut the crops. The cut crops may fall onto the header, and the cut crops may be gathered together, such as via conveyors that run across the header. The gathered agricultural crops may then be transported into the processing system of the harvester.

The conveyors may include belt rollers suitable for engaging a conveyor belt to move the conveyor belt via a rotary motion. For example, as the belt roller rotates, the conveyor belt may engage and move in a direction of the belt roller's rotation. The techniques described herein provide for belt roller mounts that secure the belt roller to a cutter bar at one end and to an infeed deck frame at an opposite end. Accordingly, a more rigid coupling is provided, that minimizes or eliminates contact between the belt roller and the infeed deck and that is less prone to deformation, for example, when a person steps onto the belt roller. Further, the mount may minimize cut crop from falling off of the conveyor belt and onto the infeed deck during operations.

Turning now to the drawings, FIG. 1 is a side view of a harvester 100 having a header. The harvester 100 includes a chassis 110 that supports harvesting apparatus to facilitate harvesting crops. As described in greater detail below, the header 112 (e.g., grain header) that cuts crops and directs the cut crops toward an inlet of a crop processing system 120 of the harvester 100 for further processing of the cut crops. The crop processing system 120 receives cut crops from the header 112. As an example, the crop processing system 120 includes a thresher 121 that conveys a flow of crops through the crop processing system 120. In some embodiments, the thresher 121 includes a cylindrical threshing rotor that transports the crops in a helical flow path. In addition to transporting the crops, the thresher 121 may also separate certain desired crop material (e.g., grain) from residue (e.g., MOG), such as husk and pods, and direct the residue into a cleaning system located beneath the thresher 121. The residue may be transported to a crop residue handling system 130, which may hold the crop residue for further processing and/or expel the crop residue from the harvester 100 via a crop residue spreading system 140 positioned at the aft end of the harvester 100.

Figure 2:
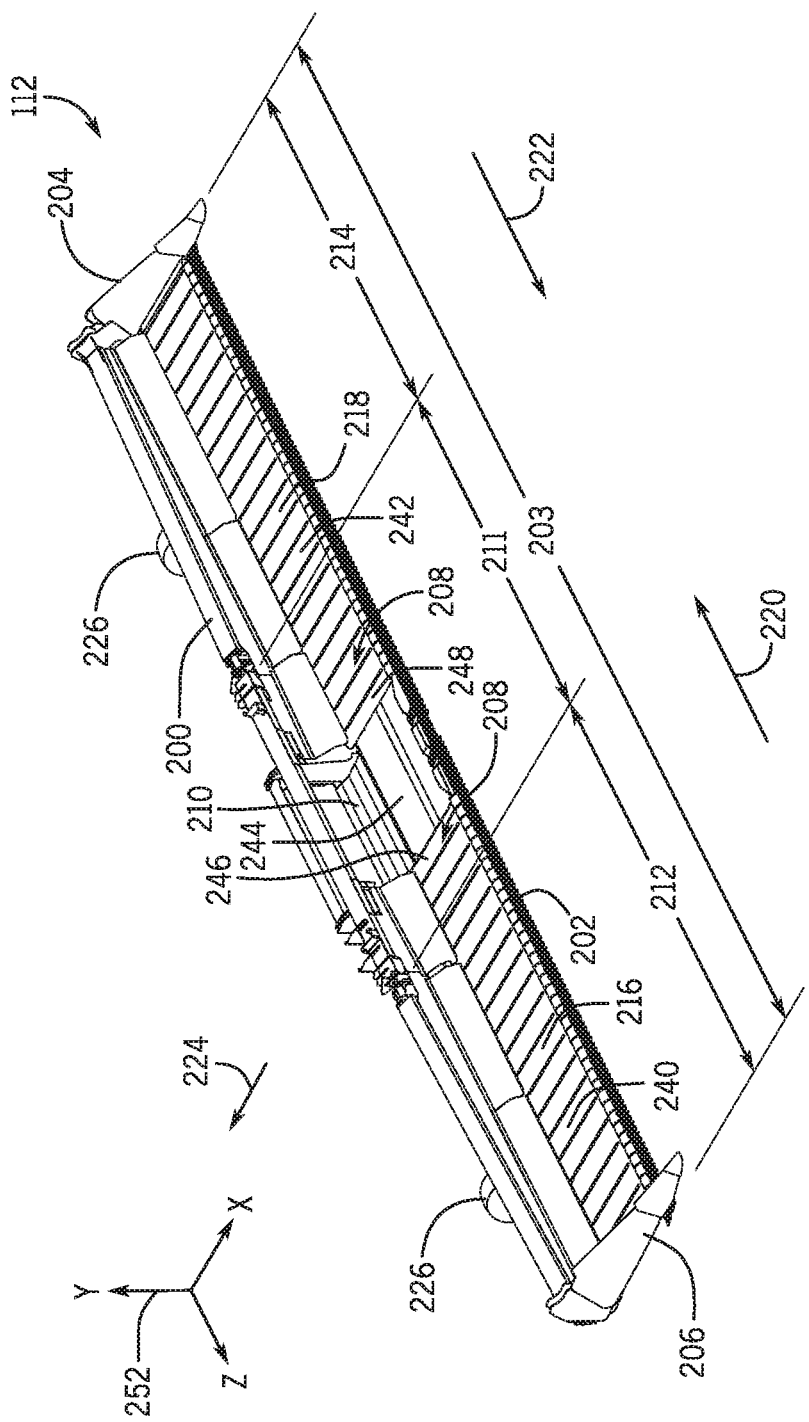
FIG. 2 is a perspective view of an embodiment of a header that may employed within the harvester of FIG. 1, in accordance with an aspect of the present disclosure.

FIG. 2 is a perspective view of an embodiment of a header 112 that may be used by the harvester of FIG. 1. It should be noted that not all components of the header 112 are shown (e.g., reel, etc.). The header 112 includes a frame 200 that may be removably coupled to a frame of the harvester 100. The header 112 also includes a cutter bar assembly 202 that extends across a width 203 of the frame 200 between side portions 204, 206 of the frame 200. When the harvester 100 is in operation, blades of the cutter bar assembly 202 engage and cut the crops. The portions of the crops that are cut may be directed onto a conveyor assembly 208 of the header 112 by a reel assembly. In general, the conveyor assembly 208 is configured to transport cut crops toward an inlet 210 and toward the crop processing system 120.

In the illustrated embodiment, the header 112 includes a center section 211, as well as a first header segment 212 and a second header segment 214 that are each pivotally coupled to opposite ends of the center section 211. The first header segment 212 and the second header segment 214 are independently adjustable. In other words, a position of the first header segment 212 is adjustable independent of a position of the second header segment 214. Likewise, a position of the second header segment 214 is adjustable independent of a position of the first header segment 212. In certain embodiments, instead of using pivotable header segments (e.g., segments 212, 214 pivotably coupled to center section 211), a single segment is used that does not include pivotable "wings."

The cutter bar assembly 202 of the header 112 may flex along its length. The cutter bar assembly 202 extends along the center section 211, the first header segment 212, and the second header segment 214. In embodiments, with a single segment, the cutter bar assembly extends along the entire length of the single segment.

The first header segment 212 is part of a first conveyor section 216 of the conveyor assembly 208, and the second header segment 214 is part of a second conveyor section 218 of the conveyor assembly 208. The first conveyor section 216 extends a portion of the width 203 of the header 112, and the second conveyor section 218 extends another portion of the width 203 of the header 112. The first conveyor section 216 may direct the crops in a first direction 220 toward the center section 211 and the second conveyor section 218 may direct the crops in a second direction 222 towards the center section 211. The center section 211 may then direct the crops to the inlet 210 in a third direction 224 via another conveyor section of the conveyor assembly 208 toward the crop processing system 120. In certain embodiments, the third direction 224 may be transverse to the first direction 220 and the second direction 222.

The header 112 may include wheels 226 to facilitate movement of the header 112 when the harvester 100 is in operation. The wheels 226 may engage with the ground to control the header height. For example, the wheels 226 may be positioned to control a height of the cutter bar assembly 202 with respect to the ground to control where crops are cut. Specifically, the wheels 226 may enable the cutter bar assembly 202 to contact the ground, in which the position of the header segments 212, 214 adjust to follow the contour of the ground. The wheels 226 may additionally or alternatively be retracted such that the header 112 is in a raised position. In the raised position of the header 112, the cutter bar assembly 202 may not be in contact with the ground and instead, may be a distance (i.e., a cutting height) above the ground. Thus, the position of the header segments 212, 214 may be independently controlled to match the contour of the cutter bar assembly 202 with the contour of the ground and maintain a substantially constant cutting height across the width 203 of the cutter bar assembly 202.

The figure illustrates conveyor belts 240, 242, disposed on the conveyor sections 216, 218 of the header segments 212, 214, respectively. The conveyor belts 240, 242 may move cut product into a conveyor 244 included in the center section 211, which may then move the product into the harvest vehicle 100. Ends 246, 248 of the conveyor sections 216 and 218 proximal to the center section 211 may include belt rollers suitable for engaging the conveyor belts 240, 242, and for rotating the conveyor belts 240, 242. The belt rollers may be mounted onto the header 112 via belt roller mounts, as described in more detail below. Also shown are axes 252.

Figure 3:
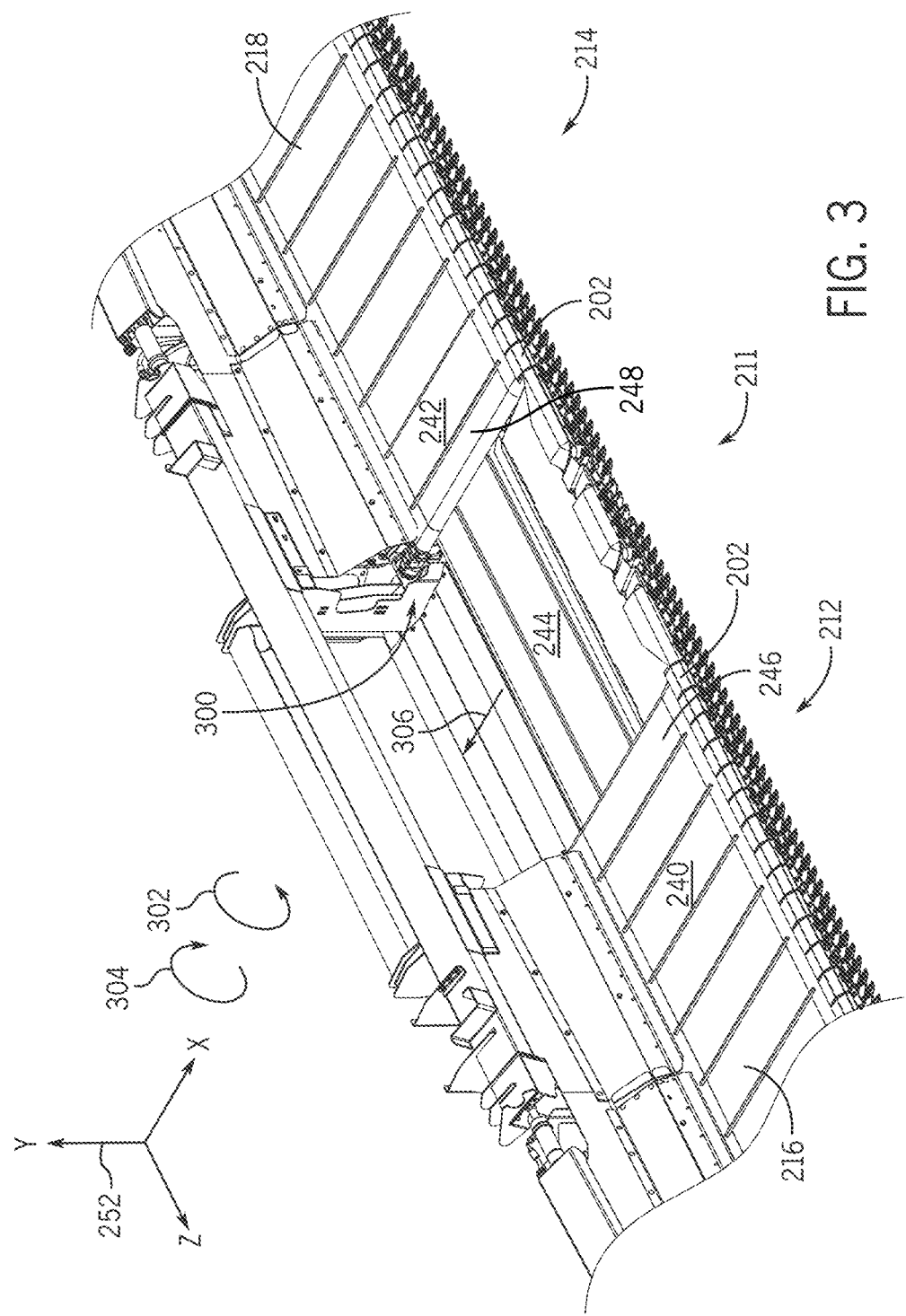
FIG. 3 is a perspective view illustrating an embodiment of the header of FIG. 2 showing further details of embodiments of a center section and proximal ends of certain conveyor sections of the header segments, in accordance with an aspect of the present disclosure.

FIG. 3 illustrates a perspective view of the header 112 showing further details of embodiments of the center section 211 and proximal ends 246, 248 of the conveyor sections 216, 218 of the header segments 212, 214. In the depicted embodiment, a first belt roller assembly 300 may rotate in a direction 302 (e.g., counterclockwise about the X axis), thus causing the conveyor belt 242 to move cut crop. Likewise, a second belt roller assembly may be disposed at proximal end 246, suitable for rotating in a direction 304 (e.g., clockwise about the X axis), causing the conveyor belt 240 to also move cut crop.

As the belt roller assemblies 300 rotate, cut product may then be moved from the conveyor belts 240, 242 onto the conveyor 244. The conveyor 244 may then move the cut product along a direction 306, for example, to be loaded onto the vehicle 100 for further processing or for transportation to a granary or other storage facility. Further details of the belt roller assemblies 300 are shown with respect to FIG. 4.

Figure 4:
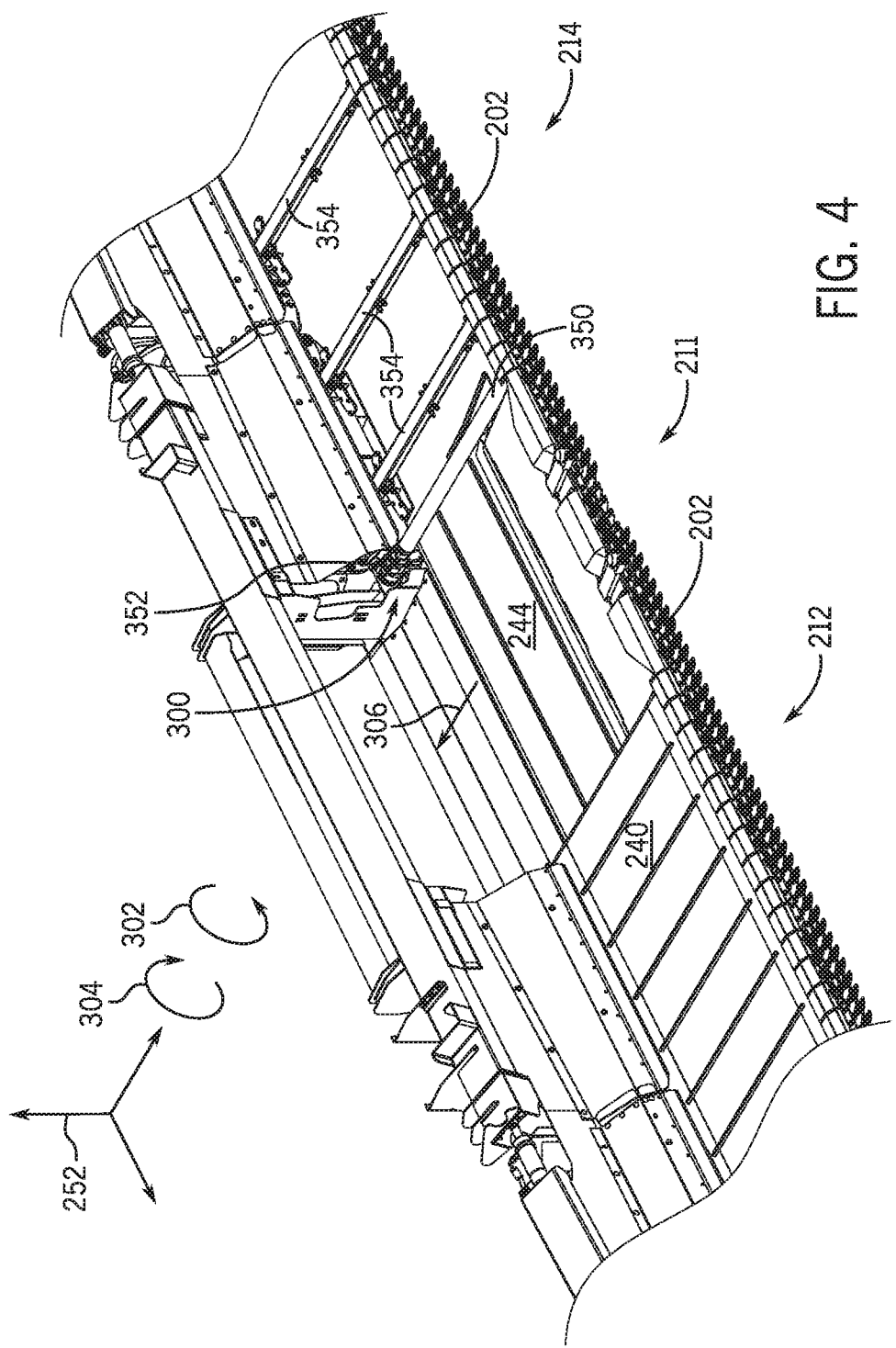
FIG. 4 is a perspective view of an embodiment of the header of FIG. 2 with a conveyor belt removed to show further details of a belt roller assembly, in accordance with an aspect of the present disclosure.

More specifically, FIG. 4 is a perspective view of an embodiment of the header 112 with the conveyor belt 242 removed to show further details of the belt roller assembly 300. In the depicted embodiment, the belt roller assembly 300 includes a cylindrical belt roller 350 mechanically coupled to a motor 352. The motor 352 may be a hydraulic motor, a pneumatic motor, an electric motor, an air-drive motor, a drive shaft, an internal combustion motor, or a combination thereof. In other embodiments, the motor 352 may not be used and the belt roller assembly 300 may include a bearing system at each end of the cylindrical belt roller 350.

Also shown are arm assemblies 354 (e.g., flex arms) that may provide support for the cutter bar assembly 202 and for the conveyor belts 240, 242. As the conveyor belts 240, 242 move and operate while the header 112 traverses a field, for example, to cut and to harvest a crop, certain components of the header 112 may flex and move. It would be beneficial to more securely mount the belt roller assembly 300 while maintaining a desired spacing to enable more efficient support and movement of the conveyor belts 240, 242.

Figure 5A:
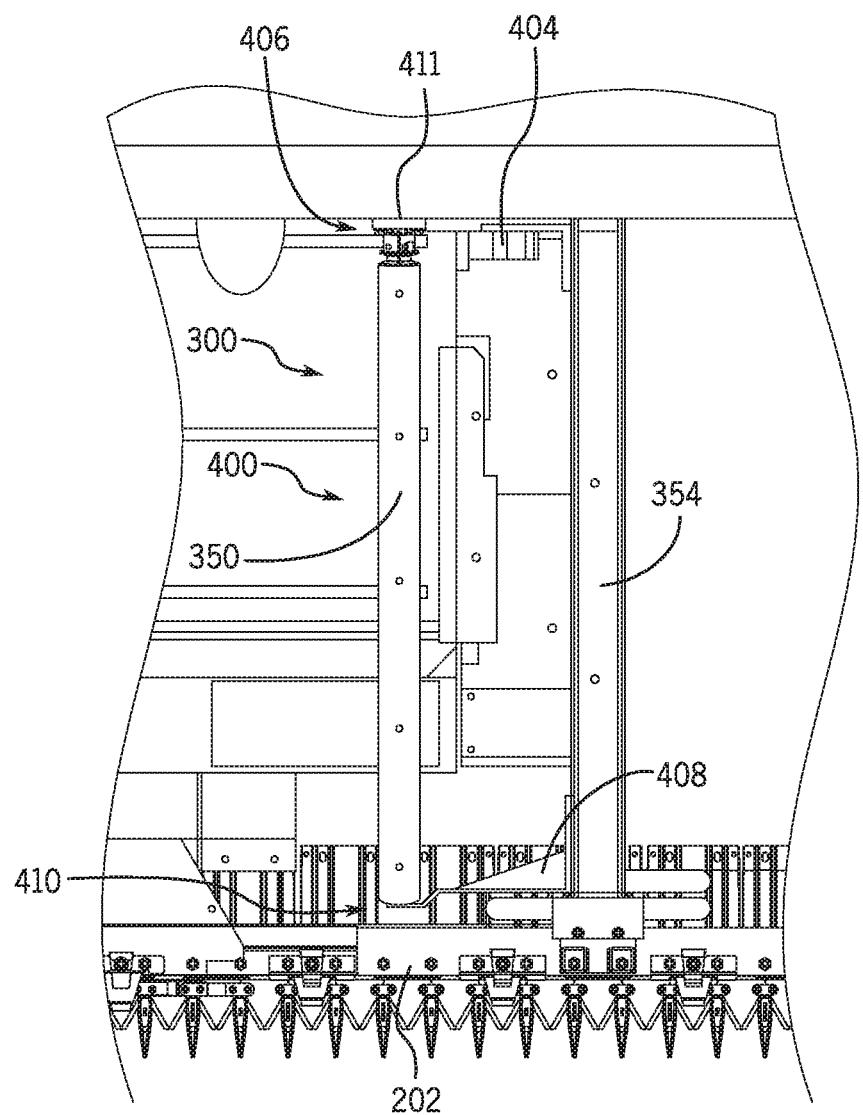
FIGS. 5A and 5B are top views illustrating embodiments of two belt roller assembly mounts, in accordance with an aspect of the present disclosure.
Figure 5B:
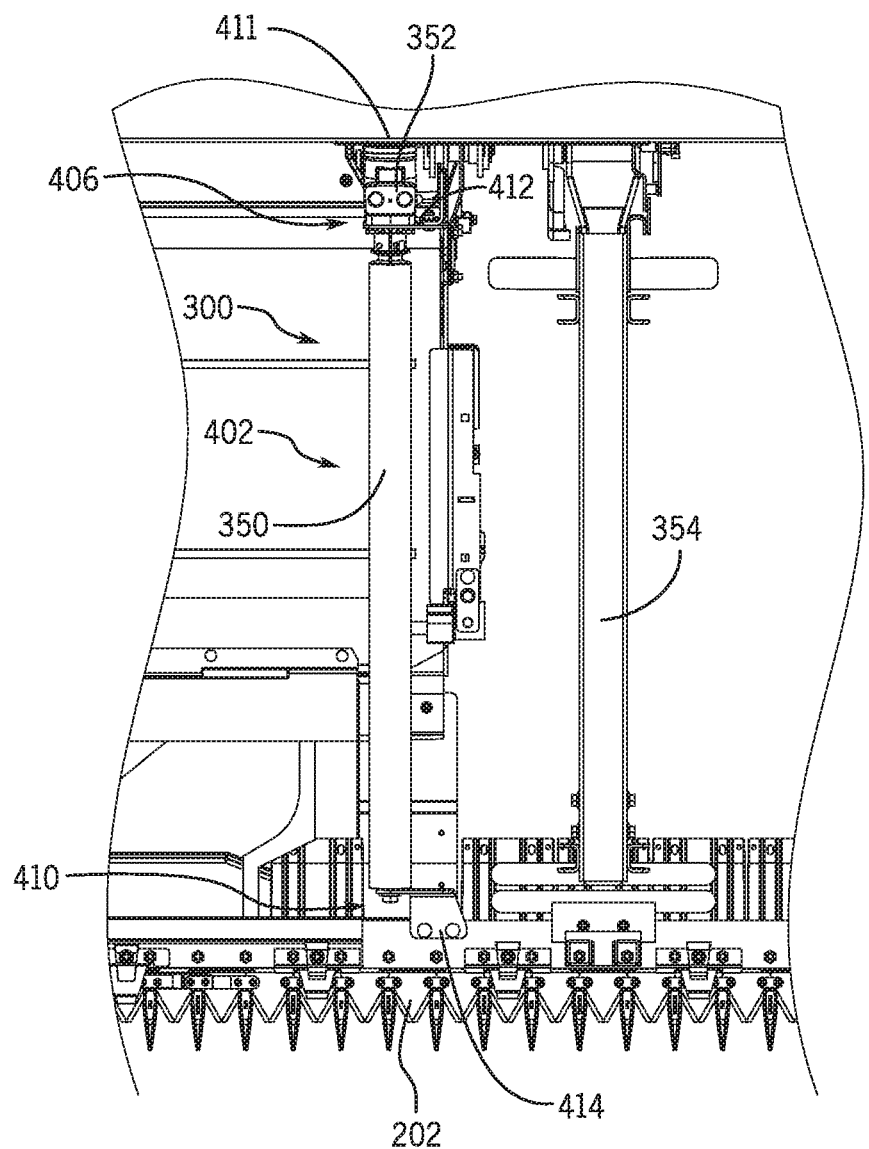

FIGS. 5A and 5B illustrates top views of embodiments of two belt roller assembly mounts 400, 402. More specifically, FIG. 5A illustrates the belt roller assembly mount 400 having a first mounting member 404 that couples a first end 406 of the belt roller assembly mount 400 to a top portion of the arm assembly 354, and a second mounting member 408 that couples second end 410 of the belt roller assembly mount 400 to a bottom portion the arm assembly 354. By using the innermost arm assembly 354 as support member for the belt roller assembly mount 400, the belt roller assembly 400 may be positioned in place to support the conveyor belt assembly 300. However, it may be beneficial to improve on the mount 400, for example, by mounting the belt roller assembly 300 onto an infeed deck frame 411.

More specifically, FIG. 5B illustrates a top view of an embodiment of the belt roller assembly mount 402 having two mounting members 412, 414. The first mounting member 412 mechanically couples the first end 406 of belt roller assembly 300 to the infeed deck frame 411. The second mounting member 414 mechanically couples the second end 410 of belt roller assembly 300 to the cutter bar assembly 202. Accordingly, the belt roller assembly mount 402 does not use the arm assembly 354 for support. Instead, the belt roller assembly mount 402 mounts the belt roller assembly 300 directly to the infeed deck frame 411 and to the cutter bar assembly 202. In use, movement of the infeed deck frame 411 may not result in any movement of the belt roller assembly 300 relative to the infeed deck frame 411 because the belt roller assembly 300 is mounted to the infeed deck frame 411 via the mount 402. Accordingly, a vertical space between the infeed deck frame 411 and the belt roller assembly 300 may always stay the same, which may result in a more efficient conveyance of the cut product. By way of contrast, when the belt roller assembly 300 is mounted to the arm assembly 354 as shown in FIG. 5A, the vertical space between the belt roller assembly 300 and the infeed deck frame 411 may change as flexing occurs. Accordingly, the mountings show in FIG. 5B are preferred because the vertical space between the belt roller assembly 300 and the infeed deck frame 411 stays the same.

Figure 6:
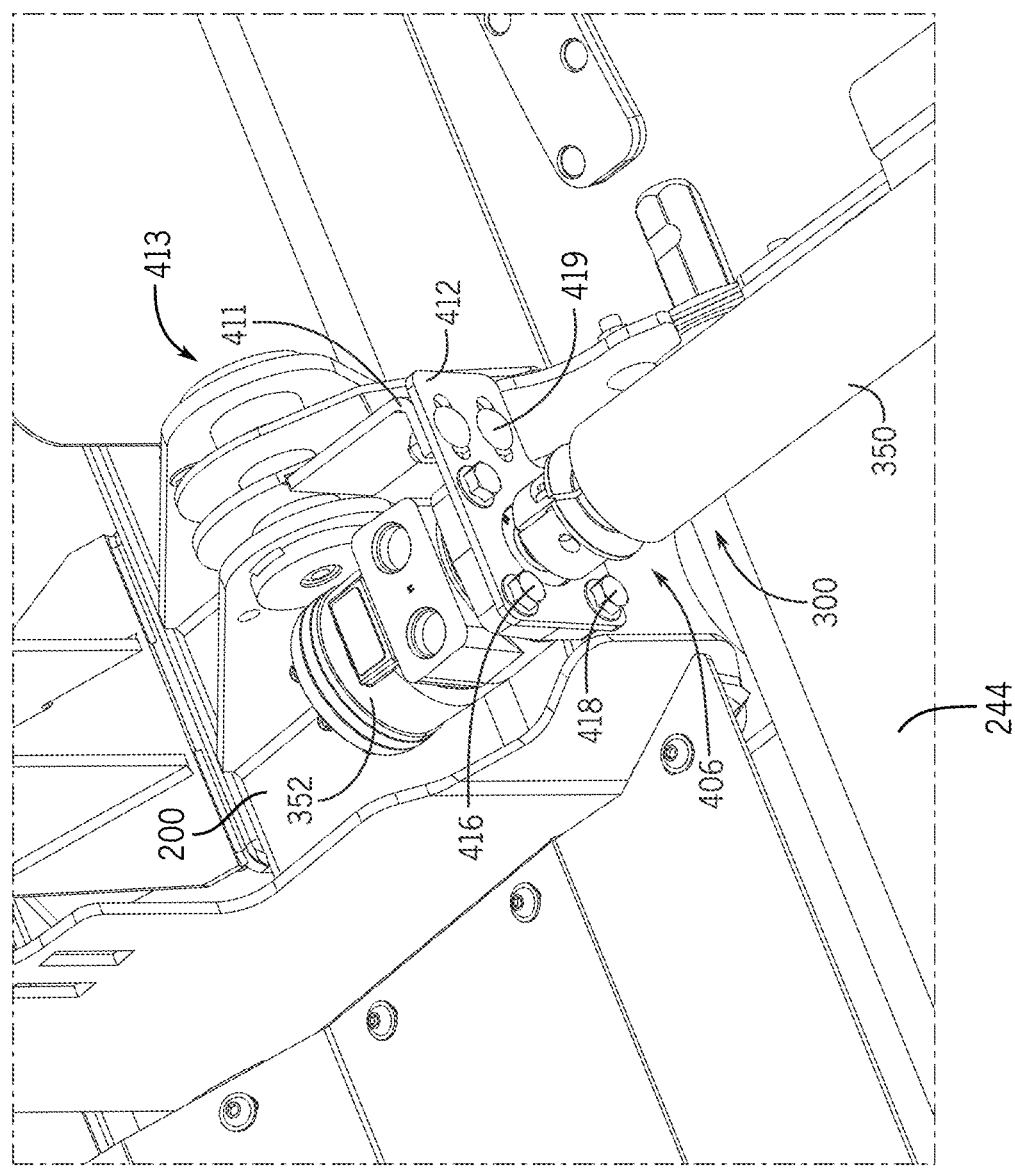
FIG. 6 is a perspective view of a first mounting member for the belt roller assembly of FIG. 5B, in accordance with an aspect of the present disclosure.

FIG. 6 illustrates a perspective view of an embodiment of the first mounting member 412 that may mechanically couple the first end 406 of the belt roller assembly 300 to the infeed deck frame 411. The infeed deck frame 411 is movably coupled to the frame 200 (e.g., header frame) of the header by a pivot joint 413, and the conveyor 244 (e.g., longitudinal conveyor) is supported by the infeed deck frame 411. In the depicted embodiment, the first mounting member 412 is a metal plate, but in other embodiments the first mounting member may include multiple metal plates, flanges, mechanical fasteners, and so on. In the depicted embodiment bolts/nut assemblies (e.g., 416, 418, and 419) may be used to couple the first mounting member 412 to the infeed deck frame 411 and/or to mount the motor 352.

In use, mounting the belt roller assembly 300 to the infeed deck frame 411 via the first mounting member 412 may provide for increased stability. For example, movement of the infeed deck frame 411 may also move the belt roller assembly 300 by a correlative amount. Accordingly, had the belt roller assembly 300 been mounted separate from the infeed deck frame 411, a space between the belt roller assembly 300 and the infeed deck frame 411 may have been increased to prevent or to ameliorate any contact between the belt roller assembly 300 and the infeed deck frame 411 because of non-correlative movements. The end 410 of the belt roller assembly 300 disposed opposite to the end 406 may be mounted to an opposite end of the infeed deck frame 411 or to cutter bar assembly 202 as shown in FIG. 7.

Figure 7:
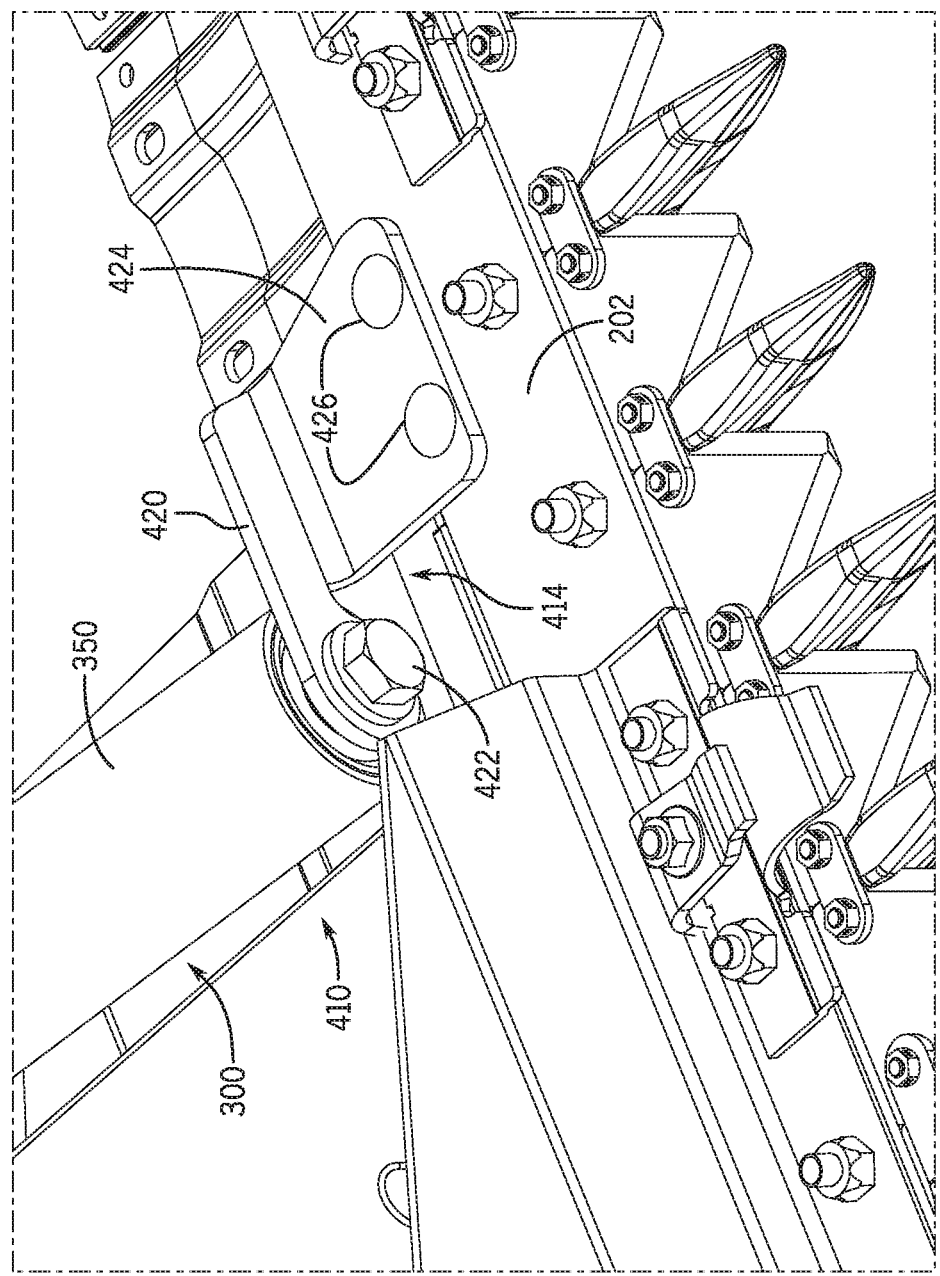
FIG. 7 is a perspective view of a second mounting member for the belt roller assembly of FIG. 5B, in accordance with an aspect of the present disclosure.

More specifically, FIG. 7 illustrates a perspective view of an embodiment of the belt roller assembly 300 showing the end 410 attached to the cutter bar assembly 202 via the second mounting member 414. In the depicted embodiment, the second mounting member 414 includes a first portion 420 connected to the belt roller assembly 300 via a fastening system 422 (e.g., threaded nut assembly). The second mounting member 414 additionally includes a second portion 424 which may be disposed at an angle from the first portion 420. The second portion 424 is shown as attached to the cutter bar assembly 202 via bolts and nuts 426. As mentioned above, the second mounting member 414 may also mount the belt roller assembly 300 to the infeed deck frame 411. By mounting the belt roller assembly 300 against the infeed deck frame 411, movement of the infeed deck frame 411 may no longer be independent of the belt roller assembly 300. Accordingly, spacing between the belt roller assembly 300 and the infeed deck frame 411 may be preserved even during operations over different terrain.

Figure 8:
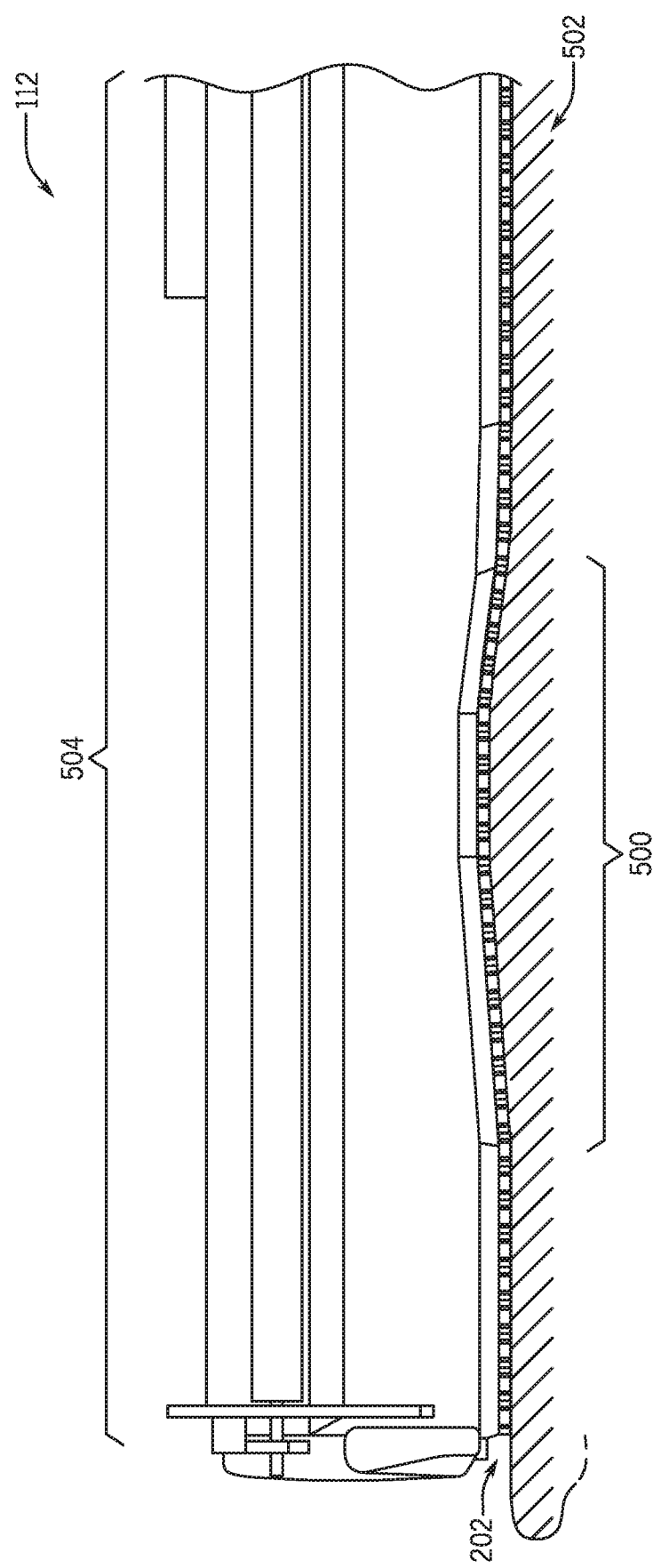
FIG. 8 is a front view of an embodiment of the header operating over a countered section of ground.

For example, and turning now to FIG. 8, the figure is a perspective view of the header 112 operating over a contoured section of ground. More specifically, section 500 of ground 502 is shown as having a rise or "hump." As mentioned earlier, the cutter bar assembly 202 may flex as shown in section 500, thus providing for a more even cutting of crop during operations over uneven terrain. During flexing, the spacing between the belt roller assembly 300 and the infeed deck frame 411 may be preserved by using the belt roller assembly mount 402 shown in FIG. 5B. Further, FIG. 8 illustrates an embodiment where the header 112 has as single section 504 that does not include the winged segments 212, 214. The single section 504 may thus provide for less componentry when compared to winged embodiments, gaining certain efficiencies in manufacture and operational use.

Figure 9:
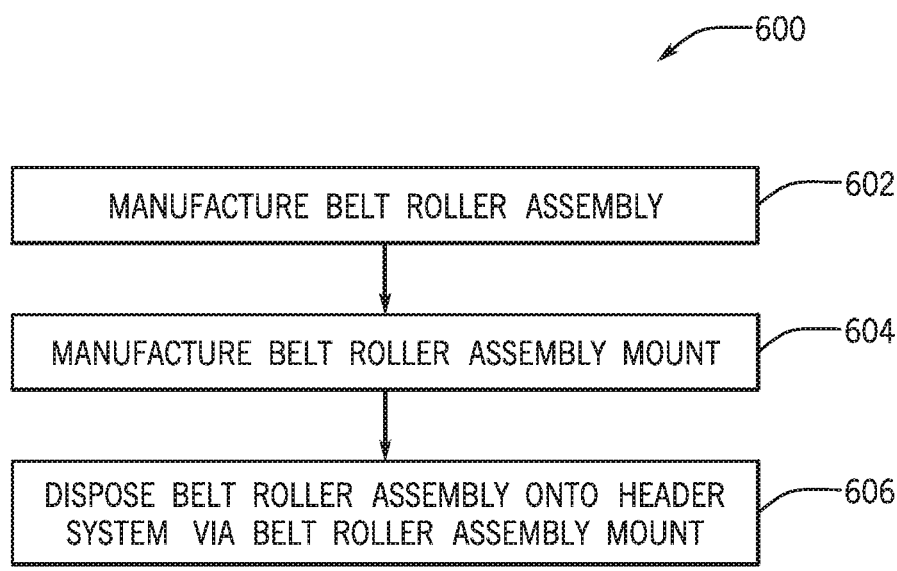
FIG. 9 is a flow chart of an embodiment of a process suitable for manufacturing components of the header of FIGS. 2-5, in accordance with an aspect of the present disclosure.

FIG. 9 is a flow chart of an embodiment of a process 600 suitable for manufacturing the header system 112 and/or components thereof. In the depicted embodiment, the process 600 may manufacture (block 602) a belt roller assembly, such as the assembly 300. To manufacture the belt roller assembly, 300, the process 600 may manufacture the cylindrical belt roller(s) 350, the motor(s) 352, bearing systems for the belt rollers 350, and so on.

The process 600 may then manufacture (block 604) the belt roller assembly mount(s) 400, 402. For example, for the process 600 may manufacture the first mounting member 412 and the second mounting member 414 when manufacturing the belt roller assembly mount 402. As mentioned earlier, the first mounting member 412 may be a metal plate suitable for mounting the end 406 of the belt roller assembly 300 to the infeed deck frame 411. The metal plate may also be used to mount the motor 352, which may then be coupled to the belt roller 350 to rotate the belt roller 350. The metal plate may be laser cut, machined, additively manufactured, and so on, in a shape as desired.

The second mounting member 414 may include the first portion 420 connected to the belt roller assembly 300 via the fastening system 422 (e.g., threaded nut assembly). The second mounting member 414 additionally may include the second portion 424 which may be disposed at an angle (e.g., 90° angle) from the first portion 420. The second mounting member may be manufactured as a single component with the first and second portions 420, 424 then angled as desired. The potions 420, 424 may also be manufactured separately and then joined, e.g., via welds.

The process 660 may then dispose or otherwise install (block 606) the belt roller assembly (e.g., assembly 300) onto the header system 112. As noted earlier, the header system 112 may include two sets of lateral belt roller assemblies 300, one set in the first header segment 212 and the second set in the second header segment 214. It is also to be understood that other belt roller assemblies 300 may be disposed along the header segments 212, 214, including at header segment ends close to the side portions 204, 206, of the frame 200.

While only certain features of the disclosure have been illustrated and described herein, many modifications and changes will occur to those skilled in the art. It is, therefore, to be understood that the appended claims are intended to cover all such modifications and changes as fall within the essence of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A header system, comprising:
a longitudinal conveyor configured to receive cut crops and to move the cut crops into a harvester vehicle, wherein the longitudinal conveyor is supported by an infeed deck frame included in the header system;
a conveyor belt configured to convey the cut crops laterally inwardly to the longitudinal conveyor;
a belt roller assembly comprising a belt roller configured to contact the conveyor belt and to rotate about an axis during movement of the conveyor belt; and
a belt roller assembly mount, wherein the belt roller assembly mount comprises a first mounting member configured to secure the belt roller to the infeed deck frame, such that the belt roller pivotably moves with the infeed deck frame relative to a header frame.

2. The system of claim 1, wherein the belt roller assembly mount further comprises a second mounting member configured to secure the belt roller to a cutter bar assembly, and wherein the cutter bar assembly is configured to cut crops to generate the cut crops.

3. The system of claim 2, wherein the second mounting member comprises a first portion and a second portion, and wherein the first portion is disposed at an angle with respect to the second portion.

4. The system of claim 3, wherein the first portion is configured to directly connect to the belt roller assembly, and the second portion is configured to directly connect to the cutter bar assembly.

5. The system of claim 1, wherein the belt roller assembly mount further comprises a second mounting member configured to secure the belt roller to the infeed deck frame at a location opposite to the first mounting member.

6. The system of claim 1, wherein the first mounting member comprises a plate configured to secure the belt roller to the infeed deck frame.

7. The system of claim 1, further comprising a center section having the longitudinal conveyor.

8. The system of claim 7, further comprising a first header segment and a second header segment, wherein the first header segment and the second header segment are pivotable about the center section.

9. The system of claim 8, wherein the first header segment, the second header segment, or a combination thereof, are configured to pivot about the center section based on terrain encountered during operations.

10. The system of claim 1, wherein the belt roller assembly further comprises a motor configured to rotate the belt roller and wherein the motor is attached via the first mounting member.

11. A header system, comprising:
a header frame;
an infeed deck frame movably coupled to the header frame;
a longitudinal conveyor supported by the infeed deck frame, wherein the longitudinal conveyor is configured to receive cut crops and to move the cut crops into a harvester vehicle;
a conveyor belt configured to convey the cut crops laterally inwardly to the longitudinal conveyor;
a belt roller assembly comprising a belt roller configured to contact the conveyor belt and to rotate about an axis during movement of the conveyor belt; and
a belt roller assembly mount, wherein the belt roller assembly mount comprises a first mounting member configured to secure the belt roller to the infeed deck frame, such that the belt roller moves with the infeed deck frame relative to the header frame.

12. The system of claim 11, wherein the belt roller assembly mount further comprises a second mounting member configured to secure the belt roller to a cutter bar assembly, to the infeed deck frame at a location opposite the first mounting member, or a combination thereof.

13. The system of claim 11, wherein the belt roller assembly further comprises a motor configured to rotate the belt roller, and wherein the motor is attached via the first mounting member.

14. The system of claim 11, further comprising a center section having the longitudinal conveyor, a first header segment, and a second header segment, wherein the first header segment and the second header segment are pivotably mounted to the center section.

15. The system of claim 14, wherein the first and the second header segments are configured to pivot about the center section based on terrain encountered during operations.

16. A method of manufacturing a header, comprising:
manufacturing a belt roller assembly, wherein the belt roller assembly comprises a belt roller configured to contact a conveyor belt and to rotate about an axis during movement of the conveyor belt, the conveyor belt is configured to convey cut crops laterally inwardly to a longitudinal conveyor, the longitudinal conveyor is configured to receive the cut crops from the conveyor belt and to move the cut crops into a harvester vehicle, and the longitudinal conveyor is supported by an infeed deck frame of the header;
manufacturing a belt roller assembly mount, wherein the belt roller assembly mount comprises a first mounting member configured to secure the belt roller to the infeed deck frame, such that the belt roller pivotably moves with the infeed deck frame relative to a header frame; and
mounting the belt roller assembly onto the infeed deck frame via the belt roller assembly mount.

17. The method of claim 16, wherein the first mounting member further comprises a plate configured to attach the first mounting member to the infeed deck frame, to a motor, or to a combination thereof.

18. The method of claim 16, wherein the belt roller assembly mount further comprises a second mounting member configured to secure the belt roller to the infeed deck frame or to a cutter bar assembly.

19. The method of claim 18, wherein the second mounting member comprises a first portion and a second portion angled with respect to the first portion, the first portion is configured to attach to the belt roller at an end opposite the first mounting member, and the second portion is configured to mount to the infeed deck frame or to the cutter bar assembly.

20. The method of claim 16, further comprising:

manufacturing a second belt roller assembly, wherein the second belt roller assembly comprises a second belt roller configured to contact a second conveyor belt and to rotate about a second axis during movement of the second conveyor belt;

manufacturing a second belt roller assembly mount, wherein the second belt roller assembly mount comprises a third mounting member configured to secure the second belt roller to the infeed deck frame; and mounting the second belt roller assembly onto the second infeed deck frame via the second belt roller assembly mount.

* * * * *